United States Patent
Crothers et al.

(10) Patent No.: US 10,155,367 B2
(45) Date of Patent: Dec. 18, 2018

(54) COORDINATED COMPOSITE TAPE LAYING

(71) Applicant: The Boeing Company, Chicago, IL (US)

(72) Inventors: Phillip John Crothers, Hampton East (AU); David Michael Bain, Ashburton (AU); Martin Alexander Szarski, Canterbury (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/982,641

(22) Filed: Dec. 29, 2015

(65) Prior Publication Data
US 2017/0182759 A1    Jun. 29, 2017

(51) Int. Cl.
| | | |
|---|---|---|
| *B32B 37/12* | (2006.01) | |
| *B32B 37/14* | (2006.01) | |
| *B29C 70/38* | (2006.01) | |
| *G05B 19/402* | (2006.01) | |
| *B32B 38/18* | (2006.01) | |

(52) U.S. Cl.
CPC ............ *B32B 37/12* (2013.01); *B29C 70/386* (2013.01); *B32B 37/14* (2013.01); *G05B 19/402* (2013.01); *B32B 2038/1891* (2013.01); *B32B 2405/00* (2013.01); *G05B 2219/45238* (2013.01); *Y02T 50/433* (2013.01)

(58) Field of Classification Search
CPC .......... B23P 21/00; B25J 5/007; B25J 9/0084; B25J 9/009; B25J 9/1612; B25J 9/1669; B25J 11/005; B29C 66/863; B29C 70/38; B29C 70/382; B29C 70/384; B29C 70/386; B29C 70/388; B32B 2038/1891; B64F 5/10
USPC .......................................................... 156/64
See application file for complete search history.

(56) References Cited

U.S. PATENT DOCUMENTS

| | | | | |
|---|---|---|---|---|
| 2005/0247396 | A1* | 11/2005 | Oldani | B29C 53/66 156/173 |
| 2006/0260751 | A1* | 11/2006 | Lauder | B29C 70/388 156/382 |
| 2015/0314890 | A1 | 11/2015 | DesJardien et al. | |

FOREIGN PATENT DOCUMENTS

DE    102007054645 A1    5/2009

OTHER PUBLICATIONS

NL 1022651 C2, Inventor: Bovenmars A J A; Hogervorst W H; Kruiper E J G; Mensink M F; Reimert P W G M; Tijs J ; Published Aug. 16, 2004, Patent Assignee Crest Eng BV; available at Derwent-Acc-No: 2004-774273.*

(Continued)

*Primary Examiner* — George Koch
(74) *Attorney, Agent, or Firm* — Yee & Associates, P.C.

(57) ABSTRACT

A method and apparatus for laying composite tape. The method may comprise driving a plurality of robots, each having a respective movement system across a movement surface, in which the movement surface faces a workpiece, and laying composite tape from the plurality of robots in a coordinated manner on the workpiece.

11 Claims, 11 Drawing Sheets

(56) References Cited

OTHER PUBLICATIONS

Definition of Robot from https://www.merriam-webster.com/dictionary/robot, accessed on Oct. 16, 2017.*
Crothers, "Substantially Simultaneous Manufacturing Functions," U.S. Appl. No. 14/630,945, filed Feb. 25, 2015, 83 pages.
Extended European Search Report, dated May 24, 2017, regarding Application No. EP16194403.8, 8 pages.

* cited by examiner

COORDINATED COMPOSITE TAPE LAYING

BACKGROUND INFORMATION

1. Field

The present disclosure generally relates to manufacturing and, in particular, to laying composite tape on a workpiece. Still more particularly, the present disclosure relates to a method and apparatus for laying composite tape on a workpiece by driving robots on a movement surface.

2. Background

Composite materials may be tough, light-weight materials created by combining two or more functional components. For example, a composite material may include reinforcing fibers bound in a polymer resin matrix. The fibers may be unidirectional or may take the form of a woven cloth or fabric.

In manufacturing composite structures, layers of composite material are typically laid up on a tool. The layers may be comprised of fibers in sheets. These sheets may take the form of fabrics, tape, tows, or other suitable forms. In some cases, resin may be infused or pre-impregnated into the sheets. These types of sheets are commonly referred to as prepreg.

With some currently available methods for laying down composite material, laying the composite tape may be performed by a robotic arm. The operations of the robotic arm may be limited to the reach of the robotic arm. Further, conventional robotic arms may be mounted to a floor or a track, thus limiting the range of the robotic arm.

Further, to decrease the amount of time to form a workpiece, additional robotic arms and additional end effectors may be used. However, conventional robotic arms may be large. A limited number of conventional robotic arms may fit within a manufacturing environment. Additionally, each robotic arm may only lay down a limited amount of composite tape at a time. In some cases, laying down composite tape using robotic arms, each with an end effector, may be more time-consuming or expensive than desired. Further, laying down composite tape using multiple robotic arms may be less efficient than desired. Yet further, coordinating multiple robotic arms may be more difficult than desired.

Further, the robotic arms may be tethered to locations on the floor of the manufacturing environment. As a result, the manufacturing environment may not be easily changed to accommodate different sizes or shapes of workpieces. Therefore, it would be desirable to have a method and apparatus that take into account at least some of the issues discussed above, as well as other possible issues.

SUMMARY

An illustrative embodiment of the present disclosure provides a method. The method may comprise driving a plurality of robots, each having a respective movement system across a movement surface, in which the movement surface faces a workpiece, and laying composite tape from the plurality of robots in a coordinated manner on the workpiece.

Another illustrative embodiment of the present disclosure provides a method. The method may comprise positioning a base having a movement surface relative to a workpiece using a movement assembly connected to the base and configured to move the base relative to the workpiece such that the movement surface faces the workpiece, and moving a robot associated with the movement surface such that the robot lays composite tape on the workpiece, in which a tape laying robot comprises a movement system coupled to a pedestal, a positioning system coupled to the pedestal, and a tape laying head connected to the positioning system.

A further illustrative embodiment of the present disclosure provides an apparatus. The apparatus may comprise a movement system configured to move a robot relative to a workpiece by moving the robot along a movement surface facing the workpiece, a tape laying head connected to the movement system, and a controller configured to coordinate tape laying on a workpiece using the tape laying head.

Yet another illustrative embodiment of the present disclosure provides an apparatus. The apparatus may comprise a base having a movement surface, a movement assembly connected to the base and configured to move the base relative to a workpiece, a plurality of robots associated with the movement surface, each of the plurality of robots comprising a movement system configured to move a robot relative to the workpiece by moving the robot along the movement surface facing the workpiece, a tape laying head connected to the movement system, and a controller configured to coordinate tape laying on the workpiece.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
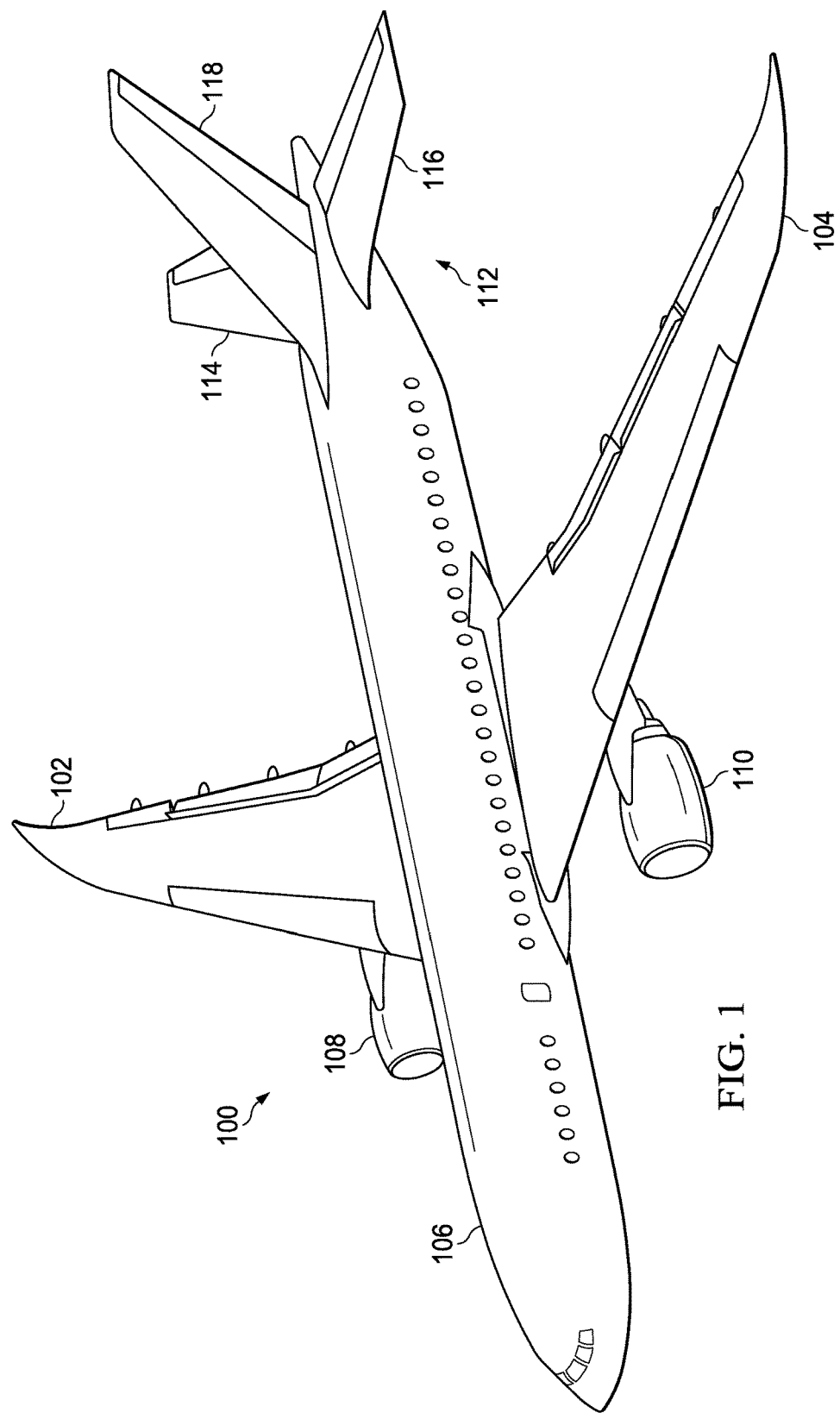
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components which may be manufactured in accordance with an illustrative embodiment. For example, composite tape may be laid down to form body 106 of aircraft 100.

Figure 14:
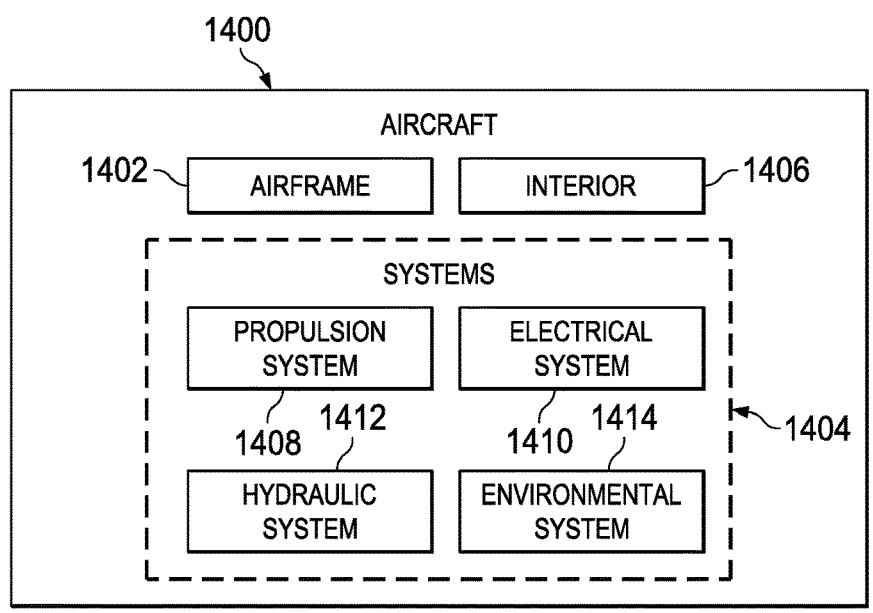
FIG. 14 is an illustration of a block diagram of an aircraft in which an illustrative embodiment may be implemented.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a military aircraft, a rotorcraft, and other suitable types of aircraft. For example, an illustration of a block diagram of aircraft 1400 is depicted in FIG. 14 described below.

Although the illustrative examples for an illustrative embodiment are described with respect to an aircraft, the illustrative embodiment may be applied to other types of platforms. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, or other suitable types of platforms.

Figure 2:
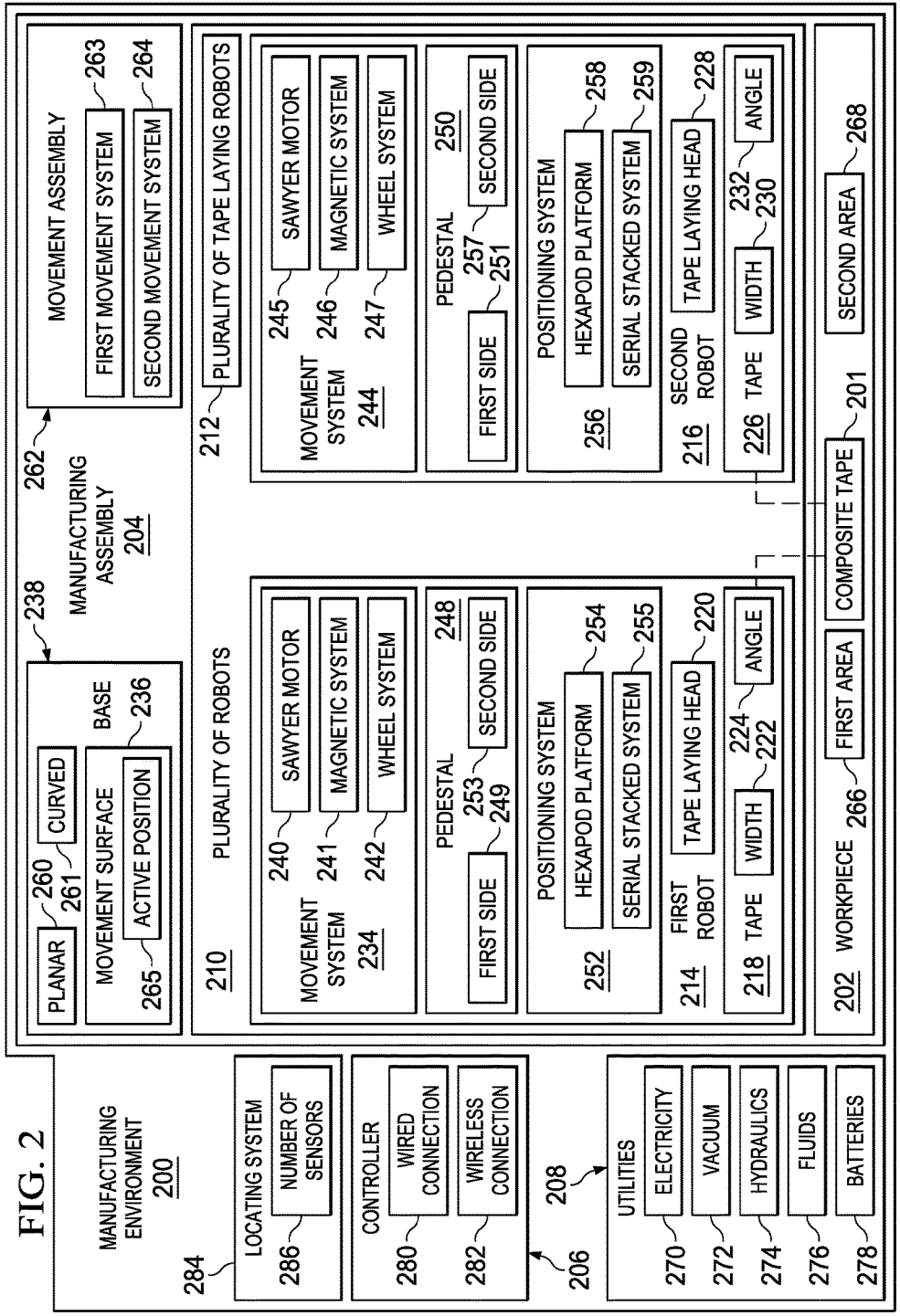
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 may be used to lay composite tape 201 on workpiece 202. In some illustrative examples, workpiece 202 may be a portion of aircraft 100 of FIG. 1, such as wing 102 or wing 104. Manufacturing environment 200 may include workpiece 202, manufacturing assembly 204, controller 206, and utilities 208.

Manufacturing assembly 204 may lay composite tape 201 on workpiece 202 using plurality of robots 210. In some illustrative examples, plurality of robots 210 may be called plurality of tape laying robots 212. Plurality of robots 210 may include first robot 214 and second robot 216. First robot 214 may lay tape 218 using tape laying head 220. Tape 218 may have width 222 and angle 224. Tape 218 may be laid down using tape laying head 220 to form portions of composite tape 201. Composite tape 201 may include portions of tape 218 that have been laid onto workpiece 202.

Second robot 216 may lay tape 226 using tape laying head 228. Tape 226 may have width 230 and angle 232. Tape 226 may be laid down using tape laying head 228 to form portions of composite tape 201. Composite tape 201 may include portions of tape 226 that have been laid onto workpiece 202. In some illustrative examples, at least one of width 222 and width 230 or angle 224 and angle 232 are the same.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

For example, angle 224 and angle 232 may both be the same. As another example, width 222 and width 230 may be the same. In some illustrative examples, at least one of width 222 and width 230 or angle 224 and angle 232 are different. For example, angle 224 and angle 232 may be different.

When angle 224 is the same as angle 232, first robot 214 and second robot 216 may operate at substantially the same time to lay down the same layer. By first robot 214 and second robot 216 operating at substantially the same time to lay down the same layer, first robot 214 and second robot 216 may effectively double the tape lay down rate. By using first robot 214 and second robot 216, the time to lay down the layer may be reduced.

When angle 224 is different than angle 232, first robot 214 and second robot 216 may lay down two different layers at substantially the same time. When first robot 214 and second robot 216 lay down two different layers at substantially the same time, overall manufacturing time of workpiece 202 may be reduced.

In some illustrative examples, second robot 216 may lay down a layer adjacent to the layer being laid down by first robot 214. In some other illustrative examples, second robot 216 may lay down a layer atop a completed portion of the layer being laid down by first robot 214. In these examples, conventional robotic arms may be undesirably large to simultaneously lay down both of the layers.

Movement system 234 may be associated with first robot 214. Movement system 234 may allow first robot 214 to move relative to movement surface 236 of base 238 of manufacturing assembly 204. Each of plurality of robots 210 may be associated with a respective movement system. Movement system 234 may be selected from at least one of sawyer motor 240, magnetic system 241, wheel system 242, or some other desirable motion system.

Sawyer motor 240 may be a type of linear electric motor. Sawyer motor 240 may use air bearings to allow for low-resistance movements. Respective air bearings may be deactivated during performance of functions by first robot 214. Sawyer motor 240 may create an air cushion to allow for movement of first robot 214.

Magnetic system 241 may allow for magnetic levitation of first robot 214. Magnetic levitation may allow for low-resistance movements. Sawyer motor 240, magnetic system 241, and wheel system 242 may each allow movement in two dimensions relative to base 238. In some illustrative examples, movement system 234 may be a combination of sawyer motor 240, magnetic system 241, wheel system 242, or some other desirable motion system.

Movement system 234 may allow for independent motion of first robot 214. For example, movement system 234 may move relative to base 238 of any other robot of plurality of robots 210 independently.

Movement system 244 may be associated with second robot 216. Movement system 244 may allow second robot 216 to move relative to movement surface 236 of base 238 of manufacturing assembly 204. Movement system 244 may be selected from at least one of sawyer motor 245, magnetic system 246, wheel system 247, or some other desirable motion system.

Movement system 234 may be connected to pedestal 248. As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components. In some illustrative examples, movement system 234 may be connected to first side 249 of pedestal 248.

Pedestal 248 may be any desirable shape. In some illustrative examples, pedestal 248 may be a plate. Pedestal 248 may be desirably rigid to retain its shape.

Movement system 244 may be connected to pedestal 250. In some illustrative examples, movement system 244 may be connected to first side 251 of pedestal 250.

Pedestal 250 may be any desirable shape. In some illustrative examples, pedestal 250 may be a plate. Pedestal 250 may be desirably rigid to retain its shape.

Positioning system 252 may also be connected to pedestal 248. In some illustrative examples, positioning system 252 may be connected to second side 253 of pedestal 248. Second side 253 may be opposite first side 249 of pedestal 248.

Tape laying head 220 may be connected to positioning system 252. Positioning system 252 may move tape laying head 220 relative to pedestal 248. Positioning system 252 may move tape laying head 220 in a plurality of degrees of freedom. For example, positioning system 252 may move tape laying head 220 in six degrees of freedom. In another example, positioning system 252 may move tape laying head 220 in any desirable degrees of freedom, such as three, four, or even five degrees of freedom. Positioning system 252 may move tape laying head 220 of first robot 214 relative to workpiece 202.

Positioning system 252 may take any desirable form. In some illustrative examples, positioning system 252 may be hexapod platform 254. Hexapod platform 254 may be a type of parallel robot that may include six actuators. In other illustrative examples, positioning system 252 may be serial stacked system 255. Serial stacked system 255 may include a plurality of stacked actuators, each configured to move in different directions.

Positioning system 256 may also be connected to pedestal 250. In some illustrative examples, positioning system 256 may be connected to second side 257 of pedestal 250. Second side 257 may be opposite first side 251 of pedestal 250.

Tape laying head 228 may be connected to positioning system 256. Positioning system 256 may move tape laying head 228 relative to pedestal 250. Positioning system 256 may move tape laying head 228 in a plurality of degrees of freedom. For example, positioning system 256 may move tape laying head 228 in six degrees of freedom. In another example, positioning system 256 may move tape laying head 228 in three degrees of freedom. Positioning system 256 may move tape laying head 228 of second robot 216 relative to workpiece 202.

Positioning system 256 may take any desirable form. In some illustrative examples, positioning system 256 may be hexapod platform 258. Hexapod platform 258 may be a type of parallel robot that may include six actuators. In other illustrative examples, positioning system 256 may be serial stacked system 259. Serial stacked system 259 may include a plurality of stacked actuators each configured to move in different direction.

Both first robot 214 and second robot 216 may move along movement surface 236 of base 238 of manufacturing assembly 204. In some illustrative examples, base 238 may be planar 260. In some illustrative examples, base 238 may be curved 261. In some examples, when base 238 is curved 261 base 238 may have complex contours. When base 238 is curved, base 238 may have a constant curvature. By having a constant curvature, base 238 may be used with sawyer motor 240 or magnetic system 241, as well as sawyer motor 245 or magnetic system 246. A surface having a constant curvature may include a planar surface. In some illustrative examples, base 238 may have a constant curvature such that base 238 may be used to manufacture a portion of body 106 of aircraft 100 in FIG. 1, having a constant curvature. Each of plurality of robots 210 may move independently of each other robot of plurality of robots 210 on movement surface 236 using a plurality of respective movement systems.

Manufacturing assembly 204 may also include movement assembly 262. Movement assembly 262 may move base 238 relative to workpiece 202. By moving base 238 relative to workpiece 202, movement assembly 262 may also move plurality of robots 210 relative to workpiece 202. Movement assembly 262 may include any desirable number of movement systems. Movement assembly 262 may include first movement system 263 and second movement system 264. In some illustrative examples, movement assembly 262 may only include one movement assembly. In some illustrative examples, movement assembly 262 may have more than two movement systems. Movement assembly 262 may take the form of at least one of a number of manipulators, a number of robots, a number of cranes, a number of crawlers, or any other desirable type of movement systems.

Movement assembly 262 may move base 238 such that movement surface 236 is in active position 265 relative to workpiece 202. When movement surface 236 of manufacturing assembly 204 is in active position 265, workpiece 202 may be within reach of plurality of robots 210. When movement surface 236 of manufacturing assembly 204 is in active position 265, movement surface 236 may face workpiece 202.

Manufacturing assembly 204 may be used to lay composite tape 201 in first area 266. Movement assembly 262 may move base 238 relative to workpiece 202 such that plurality of robots 210 may access first area 266. Second area 268 may not be accessible by plurality of robots 210 when base 238 is positioned relative to first area 266. In some illustrative examples, base 238 may be moved relative to second area 268 so that plurality of robots 210 may lay composite tape 201 within second area 268.

Utilities 208 may be provided to manufacturing assembly 204. Utilities 208 may include electricity 270, vacuum 272, hydraulics 274, fluids 276, or other desirable utilities. For example, utilities 208 may also include desirable utilities not depicted in FIG. 2. In one illustrative example, utilities 208 may also include pressurized air.

Utilities 208 may be provided to plurality of robots 210 to lay composite tape 201. For example, electricity 270 may be provided to at least one of movement system 234, positioning system 252, movement system 244, or positioning system 256 to move at least one of tape laying head 220 or tape laying head 228. Electricity 270 may be provided through wires or other desirable physical connections. In some illustrative examples, rather than receiving electricity 270 from physical connections, at least one robot of plurality of robots 210 may be powered by batteries 278. In some illustrative examples, rather than receiving electricity 270 from physical connections, at least one robot of plurality of robots 210 may be powered through a wireless technology, such as Wi-Fi.

Controller 206 may be configured to coordinate tape laying on workpiece 202 using at least one of tape laying head 220 or tape laying head 228. Controller 206 may be implemented in software, hardware, firmware, or a combination thereof. When software is used, the operations performed by controller 206 may be implemented in program code configured to run on a processor unit. When firmware is used, the operations performed by controller 206 may be implemented in program code and data and stored in persistent memory to run on a processor unit. When hardware is employed, the hardware may include circuits that operate to perform the operations in controller 206.

Controller 206 may communicate with at least one robot of plurality of robots 210. Controller 206 may direct or control laying tape 218 by first robot 214. Controller 206 may direct or control laying tape 226 by second robot 216.

In some illustrative examples, controller 206 may communicate with at least one robot of plurality of robots 210 using wired connection 280. In some illustrative examples, controller 206 may communicate with at least one robot of plurality of robots 210 using wireless connection 282. In some illustrative examples, each of plurality of robots 210 may be associated with a respective wireless communication device and a respective battery so that each of plurality of robots 210 may be wireless.

The location of each of plurality of robots 210 relative to each other may be important during processing. Further, properly locating the plurality of robots 210 relative to workpiece 202 may be extremely important. For example, laying composite tape 201 may require a high level of precision. Controller 206 may communicate with other systems or components to track, control, or locate at least one robot of plurality of robots 210. For example, controller 206 may communicate with locating system 284. Locating system 284 may include number of sensors 286. In some illustrative examples, locating system 284 may be a real-time locating system. Locating system 284 may use any desirable technology. For example, locating system 284 may use radio-frequency identification (RFID), optical sensors, acoustic sensors, telemetry, or any other desirable type of locating technology. In some examples, the real-time locating system may be a form of a global positioning system (GPS).

In some illustrative examples, number of sensors 286 may be used to determine a location of a robot of plurality of robots 210 on movement surface 236. In some illustrative examples, number of sensors 286 may be used to determine a location of a robot of plurality of robots 210 relative to workpiece 202.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a second manufacturing assembly (not depicted) may have a respective plurality of robots (not depicted) which may lay composite tape on workpiece 202. The second manufacturing assembly may be positioned relative to workpiece 202 so that the plurality of robots on the second manufacturing assembly may lay composite tape on a different area of workpiece 202 than plurality of robots 210 of manufacturing assembly 204.

Figure 3:
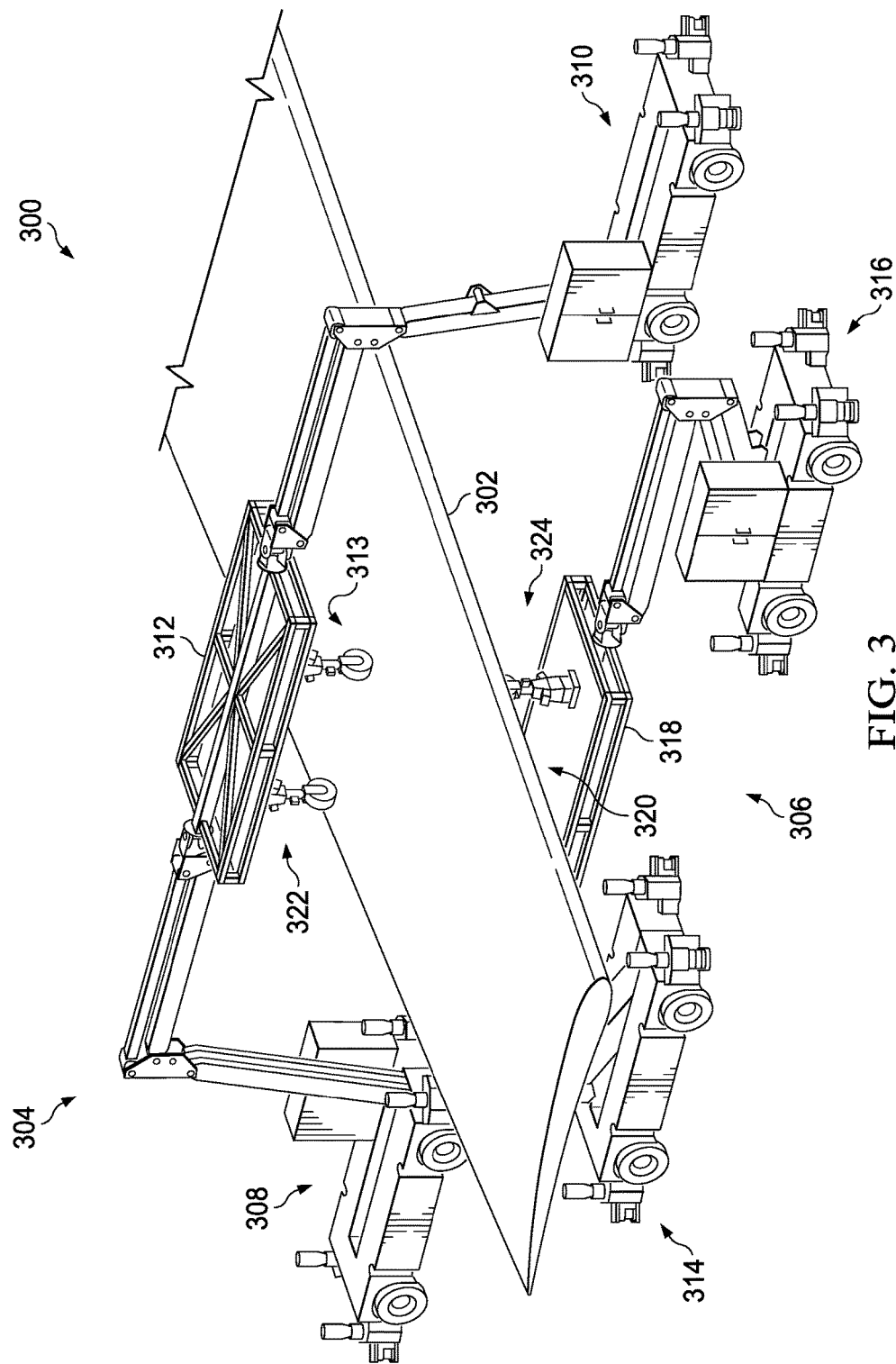
FIG. 3 is an illustration of a manufacturing environment in accordance with an illustrative embodiment.

Turning now to FIG. 3, an illustration of a manufacturing environment is depicted in accordance with an illustrative embodiment. Manufacturing environment 300 may be a physical implementation of manufacturing environment 200 shown in block form in FIG. 2. Manufacturing environment 300 may be an example of an environment in which manufacturing functions may be performed on components of aircraft 100 of FIG. 1, such as wing 102 or wing 104.

Manufacturing environment 300 may include workpiece 302, manufacturing assembly 304, and manufacturing assembly 306. Workpiece 302 may be an example of wing 102 of FIG. 1 prior to attaching wing 102 to aircraft 100. Workpiece 302 may be a physical implementation of workpiece 202 of FIG. 2. Manufacturing assembly 304 may include movement system 308, movement system 310, and base 312. Manufacturing assembly 304 may be a physical implementation of manufacturing assembly 204 of FIG. 2. Workpiece 302 is depicted as substantially planar. As a result, base 312 is also substantially planar. Base 312 may have a substantially constant curvature that complements the shape of workpiece 302. As a result, if workpiece 302 is curved, base 312 may also be curved.

Base 312 may be positioned relative to first area 313 of workpiece 302. Movement system 308 and movement system 310 may move base 312 to position base 312 relative to desired areas of workpiece 302. Manufacturing assembly 306 may include movement system 314, movement system 316, and base 318. Base 318 may be positioned relative to second area 320 of workpiece 302. Movement system 314 and movement system 316 may move base 318 to position base 318 relative to desired areas of workpiece 302.

Plurality of robots 322 is associated with base 312. Plurality of robots 324 is associated with base 318. As depicted, base 312 and base 318 face workpiece 302 such that plurality of robots 322 and plurality of robots 324 may work on workpiece 302.

Manufacturing environment 300 of FIG. 3 is not meant to imply physical or architectural limitations to the manner in which an illustrative embodiment may be implemented. Other components in addition to or in place of the ones illustrated may be used. Some components may be unnecessary. For example, instead of movement system 308 and movement system 310 of manufacturing assembly 304, a number of alternative movement systems may be present. For example, manufacturing assembly 304 may instead have a single robotic arm. As another example, manufacturing assembly 304 may include a crane.

Figure 4:
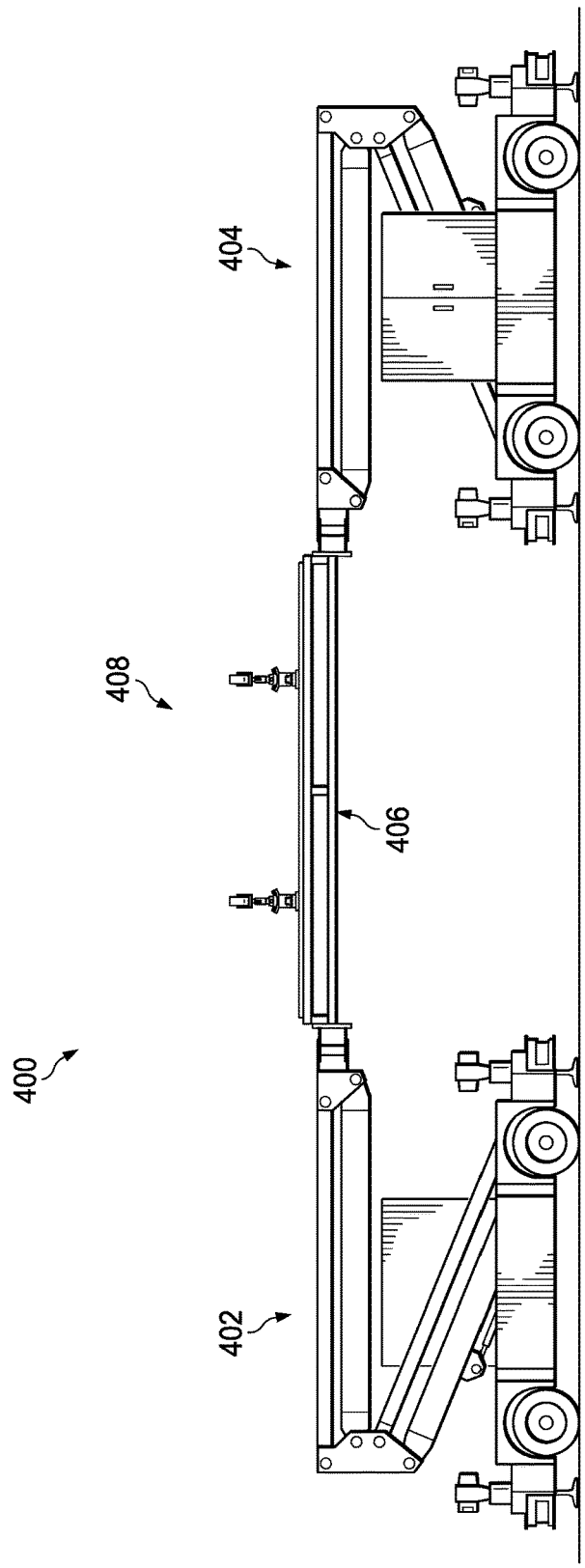
FIG. 4 is an illustration of a manufacturing assembly in accordance with an illustrative embodiment.

Turning now to FIG. 4, an illustration of a manufacturing assembly is depicted in accordance with an illustrative embodiment. Manufacturing assembly 400 may be a physical implementation of manufacturing assembly 204 shown in block form in FIG. 2. Manufacturing assembly 400 may be a depiction of manufacturing assembly 304 or manufacturing assembly 306 of FIG. 3.

Manufacturing assembly 400 may include movement system 402, movement system 404, base 406, and plurality of robots 408. Movement system 402 and movement system 404 may move base 406 and plurality of robots 408 in at least one dimension. Plurality of robots 408 may move relative to base 406.

Figure 5:
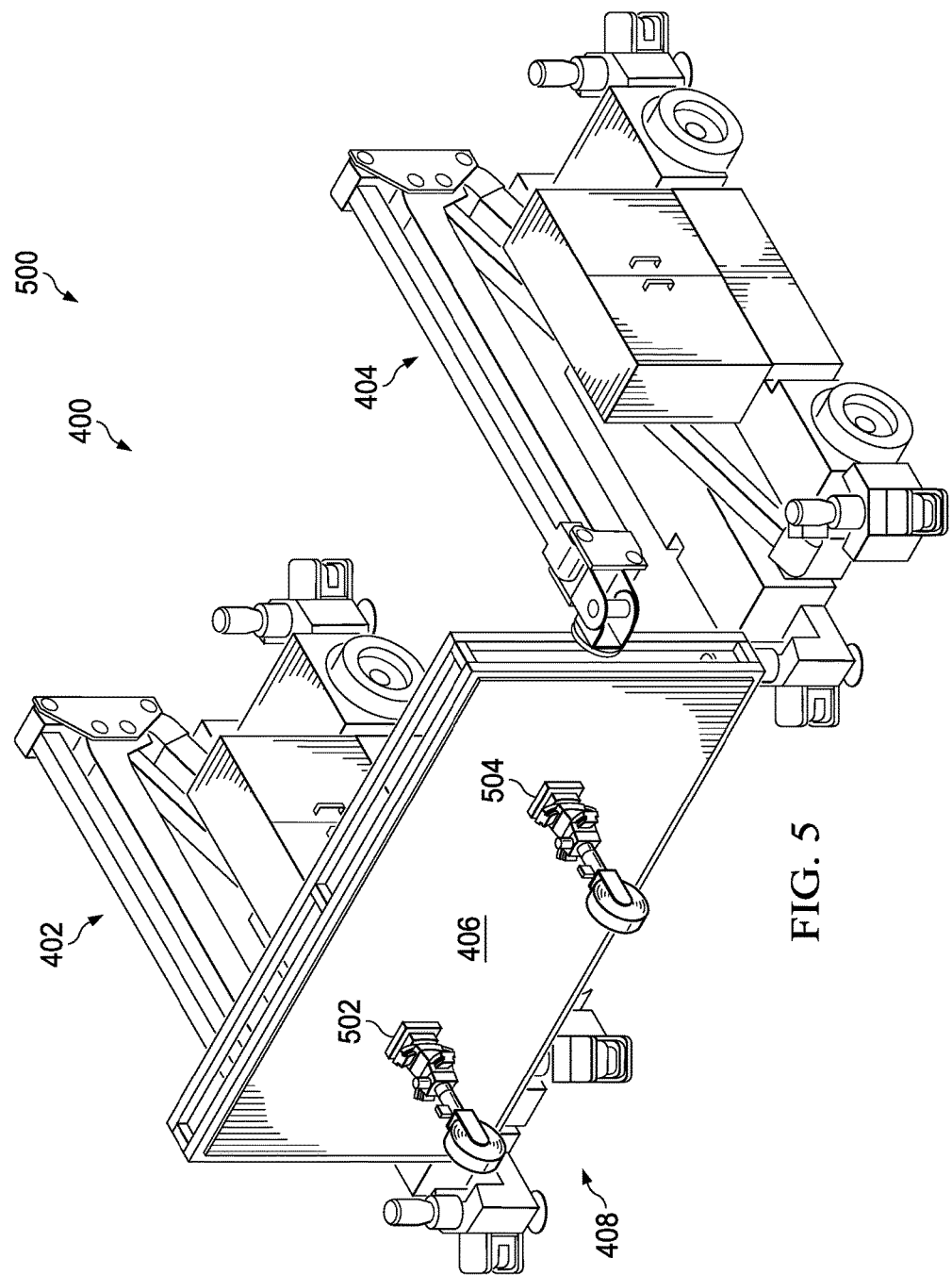
FIG. 5 is an illustration of a manufacturing assembly in accordance with an illustrative embodiment.

Turning now to FIG. 5, an illustration of a manufacturing assembly is depicted in accordance with an illustrative embodiment. View 500 may be a view of manufacturing assembly 400 after moving movement system 402 and movement system 404. View 500 may be a view of manufacturing assembly 400 such that each of movement system 402, movement system 404, and base 406 face sideways.

Manufacturing assembly 400, as positioned in FIG. 4, may work on a horizontal workpiece. For example, manufacturing assembly 400, as shown in FIG. 4, may work on a surface substantially parallel to the ground. Manufacturing assembly 400, as positioned in view 500, may be used to work on a vertical workpiece. For example, manufacturing assembly 400, as shown in FIG. 5, may be used to work on a surface substantially perpendicular to the ground. Base 406 could potentially be held at any angle relative to the ground. Further, although two movement systems are depicted, base 406 could be held and moved by any number of movement systems.

As can be seen in view 500, each of plurality of robots 408 may move independently of each other. For example, robot 502 may move in any direction relative to base 406, including around or to the opposite side of robot 504. Robot 502 and robot 504 may have coordinated movements so a collision is avoided. However, robot 502 and robot 504 may move in any desirable direction independent of the motion of the other.

Figure 6:
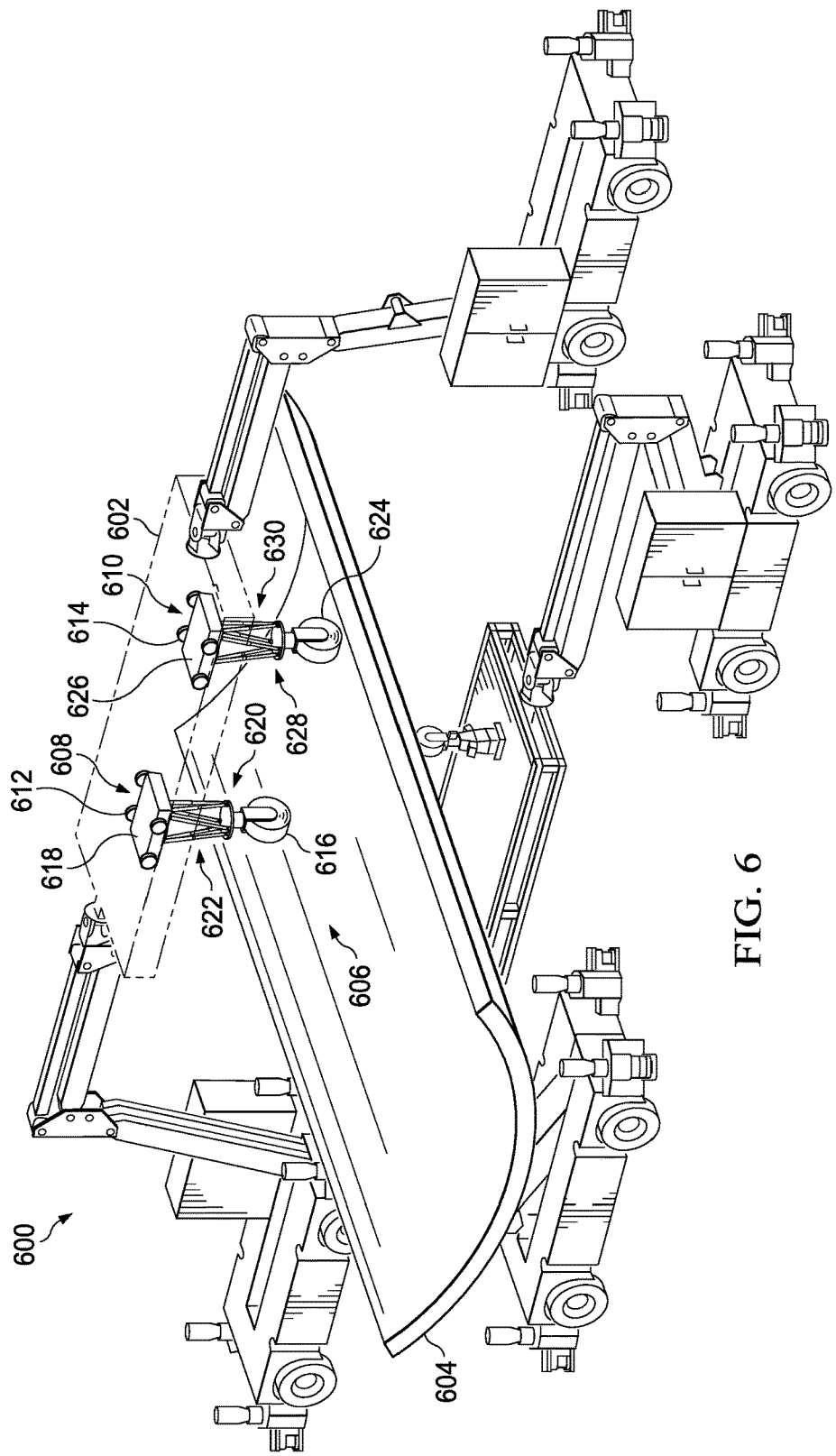
FIG. 6 is an illustration of a manufacturing assembly operating within a manufacturing environment in accordance with an illustrative embodiment.

Turning now to FIG. 6, an illustration of a manufacturing assembly operating within a manufacturing environment is depicted in accordance with an illustrative embodiment. Manufacturing environment 600 may be a physical implementation of manufacturing environment 200 shown in block form in FIG. 2. Manufacturing environment 600 may be an example of an environment in which manufacturing functions may be performed on components of aircraft 100 of FIG. 1, such as body 106.

Manufacturing environment 600 may include base 602, workpiece 604, and plurality of robots 606. As depicted, base 602 is transparent for ease of demonstration only. Plurality of robots 606 may include robot 608 and robot 610. Robot 608 and robot 610 may move along a movement surface (not depicted) of base 602 that faces workpiece 604. Robot 608 may move along the movement surface (not depicted) using movement system 612. Robot 610 may move along movement surface (not depicted) using movement system 614.

Robot 608 and robot 610 may each lay down composite tape (not depicted) on workpiece 604. Robot 608 and robot 610 may lay down composite tape independent of each other. However, robot 608 and robot 610 may lay down composite tape in a coordinated fashion. For example, robot 608 and robot 610 may work together to lay down a first layer of composite tape having a first fiber angle. In another example, robot 608 may lay down a first layer of composite tape having a first fiber angle while robot 610 may lay down a second layer of composite tape having a second fiber angle.

Robot 608 may lay down composite tape by moving tape laying head 616 relative to workpiece 604. In one example, robot 608 may move tape laying head 616 relative to workpiece 604 by moving pedestal 618 of robot 608 relative to base 602 using movement system 612. Robot may move tape laying head 616 relative to workpiece 604 by using positioning system 620. In this illustrative example, positioning system 620 may take the form of hexapod platform 622.

Robot 610 may lay down composite tape by moving tape laying head 624 relative to workpiece 604. In one example, robot 610 may move tape laying head 624 relative to workpiece 604 by moving pedestal 626 of robot 610 relative to base 602 using movement system 614. Robot 610 may move tape laying head 624 relative to workpiece 604 by using positioning system 628. In this illustrative example, positioning system 628 may take the form of hexapod platform 630.

As depicted, base 602 may be planar. Workpiece 604 may have a constant curvature. Although the curvature of workpiece 604 is different than base 602, positioning system 620 and positioning system 628 may move tape laying head 616 and tape laying head 624 to adjust for the curvature of workpiece 604.

Figure 7:
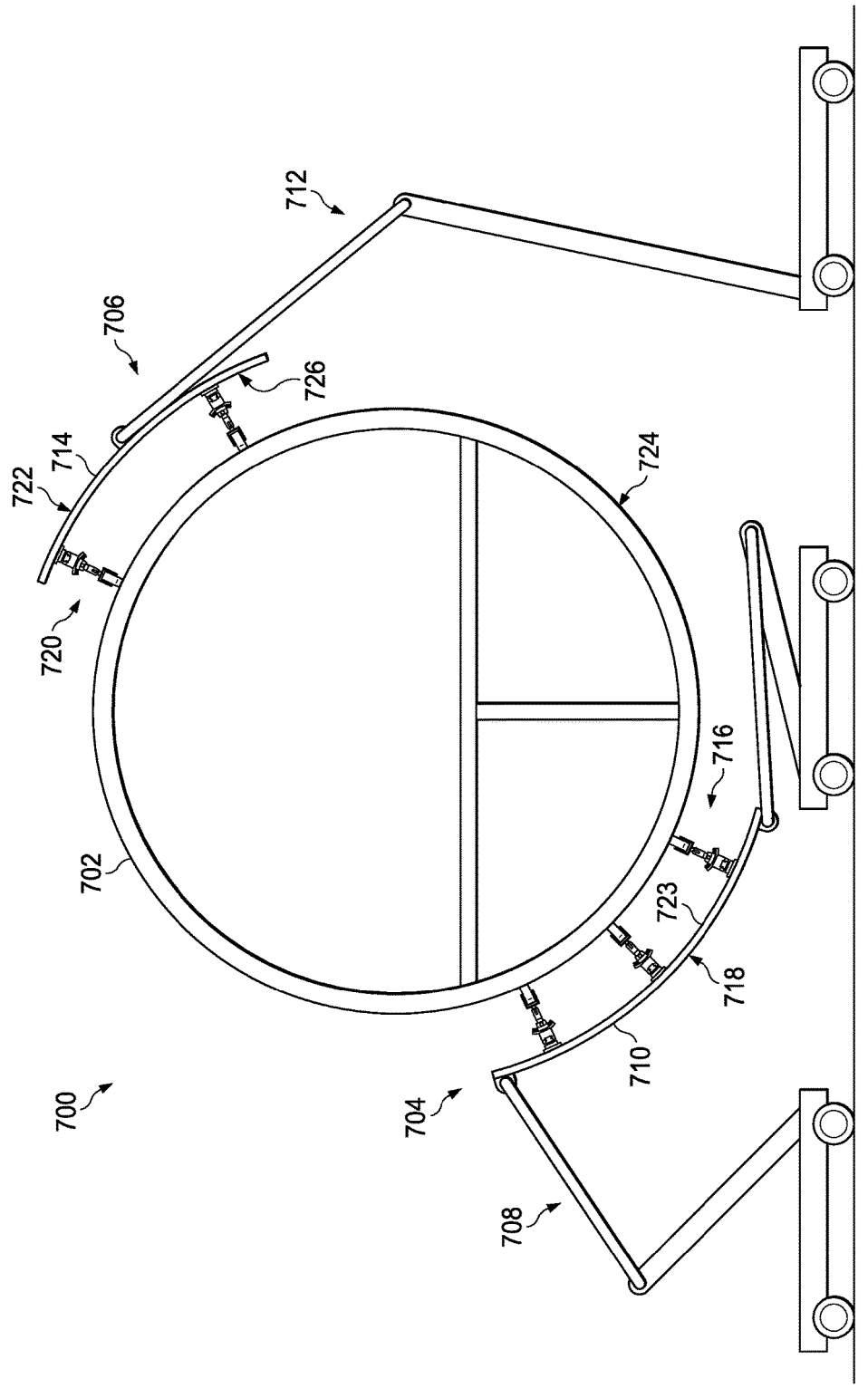
FIG. 7 is an illustration of a manufacturing assembly operating within a manufacturing environment in accordance with an illustrative embodiment.

Turning now to FIG. 7, an illustration of a manufacturing assembly operating within a manufacturing environment is depicted in accordance with an illustrative embodiment. Manufacturing environment 700 may be a physical implementation of manufacturing environment 200 shown in block form in FIG. 2. Manufacturing environment 700 may be an example of an environment in which manufacturing functions may be performed on components of aircraft 100 of FIG. 1, such as body 106.

Manufacturing environment 700 may include workpiece 702, manufacturing assembly 704, and manufacturing assembly 706. Manufacturing assembly 704 may include number of movement systems 708 and base 710. Manufacturing assembly 706 may include number of movement systems 712 and base 714. Number of movement systems 708 may move base 710 relative to workpiece 702. Number of movement systems 712 may move base 714 relative to workpiece 702. Movement of base 710 or base 714 may be considered macro movements Plurality of robots 716 may be associated with movement surface 718 of base 710. Plurality of robots 720 may be associated with movement surface 722 of base 714. Movement of base 710 or base 714 may be considered macro movements relative to workpiece 702 for plurality of robots 716 or plurality of robots 720 respectively. Plurality of robots 716 may move in micro movements relative to workpiece 702 independently using a plurality of respective movement systems (not depicted). Plurality of robots 720 may move in micro movements relative to workpiece 702 independently using a plurality of respective movement systems (not depicted).

Movement of plurality of robots 716 relative to base 710 may be a finer movement than movement of number of movement systems 708 relative to workpiece 702. Movement of tape laying heads (not depicted) of plurality of robots 716 by respective positioning systems (not depicted) may be a finer movement than movement of plurality of robots 716 relative to base 710.

As depicted, curvature 723 of base 710 may be complementary to curvature 724 of workpiece. Further, curvature 726 of base 714 may be complementary to curvature 724 of workpiece 702. Curvature 723 and curvature 726 may be substantially the same.

Figure 8:
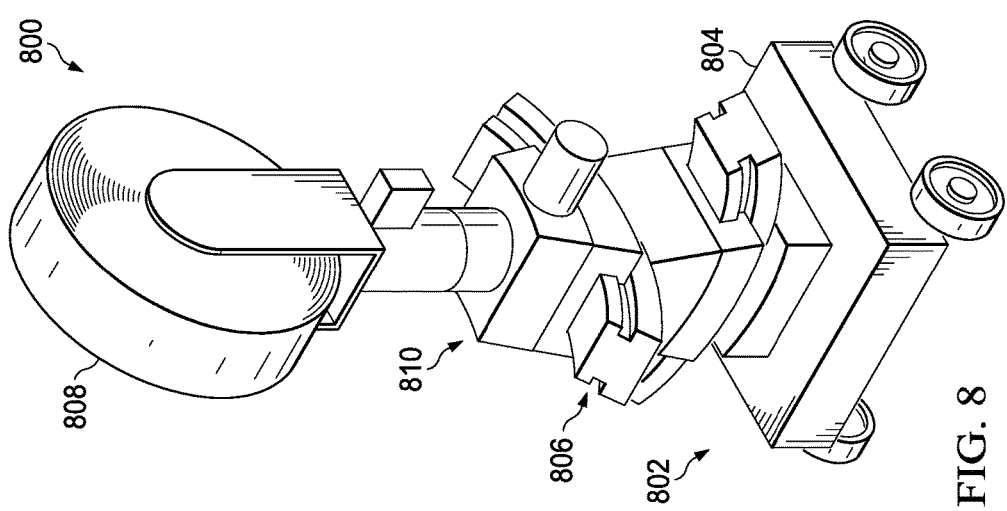
FIG. 8 is an illustration of a robot in accordance with an illustrative embodiment.

Turning now to FIG. 8, an illustration of a robot is depicted in accordance with an illustrative embodiment. Robot 800 may be a physical implementation of one of plurality of robots 210 of FIG. 2. For example, robot 800 may be a physical implementation of first robot 214 of FIG. 2.

Robot 800 may include movement system 802, pedestal 804, positioning system 806, and tape laying head 808. As depicted, positioning system 806 may take the form of serial stacked system 810.

Robot 800 may lay composite tape (not depicted) on a workpiece (not depicted) by moving tape laying head 808 relative to the workpiece (not depicted). Tape laying head 808 may be moved relative to the workpiece (not depicted) using at least one of movement system 802 or positioning system 806.

In some illustrative examples, robot 800 may also have a controller (not depicted). In other illustrative examples, robot 800 may have a wireless communication device (not depicted) to allow robot 800 to communicate with a controller (not depicted) external to robot 800. In some illustrative examples, robot 800 may have a locating system (not depicted). For example, robot 800 may have a number of sensors (not depicted).

Figure 9:
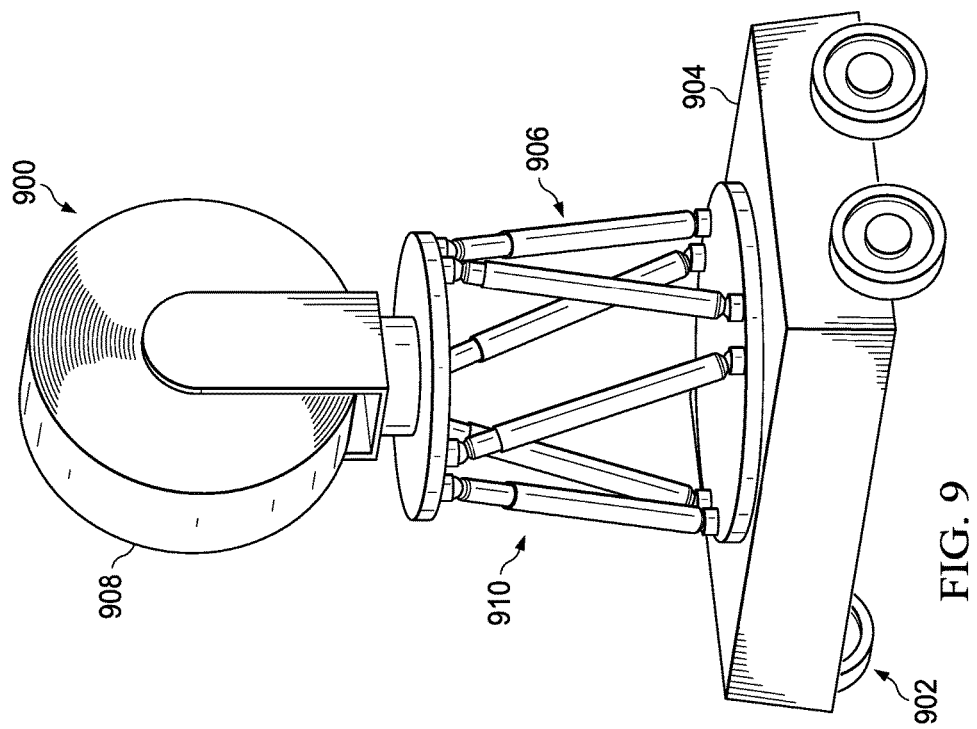
FIG. 9 is an illustration of a robot in accordance with an illustrative embodiment.

Turning now to FIG. 9, an illustration of a robot is depicted in accordance with an illustrative embodiment. Robot 900 may be a physical implementation of one of plurality of robots 210 of FIG. 2. For example, robot 900 may be a physical implementation of first robot 214 of FIG. 2.

Robot 900 may include movement system 902, pedestal 904, positioning system 906, and tape laying head 908. As depicted, positioning system 906 may take the form of hexapod platform 910.

Robot 900 may lay composite tape (not depicted) on a workpiece (not depicted) by moving tape laying head 908 relative to the workpiece (not depicted). Tape laying head 908 may be moved relative to the workpiece (not depicted) using at least one of movement system 902 or positioning system 906.

In some illustrative examples, robot 900 may also have a controller (not depicted). In other illustrative examples, robot 900 may have a wireless communication device (not depicted) to allow robot 900 to communicate with a controller (not depicted) external to robot 900, such as controller 206 of FIG. 2. In one illustrative example, robot 900 may communicate with controller 206 of wireless connection 282. In some illustrative examples, robot 900 may have a locating system (not depicted). For example, robot 900 may have a number of sensors (not depicted). The number of sensors may be an example of number of sensors 286 of locating system 284 of FIG. 2.

The illustrations of aircraft 100 in FIG. 1, manufacturing environment 200 in FIG. 2, manufacturing assemblies in FIGS. 3-7, robot 800 in FIG. 8, and robot 900 in FIG. 9 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although plurality of robots 210 is depicted as having first robot 214 and second robot 216, plurality of robots 210 may contain any desirable number of robots greater than or equal to two. For example, plurality of robots 210 may include three robots. As another example, plurality of robots 210 may include four functional robots.

Further, manufacturing assembly 204 may include more than one controller. For example, manufacturing assembly 204 may include more controllers than just controller 206. For example, another controller may communicate with at least one robot of plurality of robots 210 using at least one of wired connection 280 or wireless connection 282. Yet further, manufacturing assembly 204 may include a system of controllers.

The different components shown in FIGS. 1 and 3-19 may be combined with components in FIG. 2, used with components in FIG. 2, or a combination of the two. Additionally, some of the components in FIGS. 1 and 3-19 may be illustrative examples of how components shown in block form in FIG. 2 may be implemented as physical structures.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Figure 10:
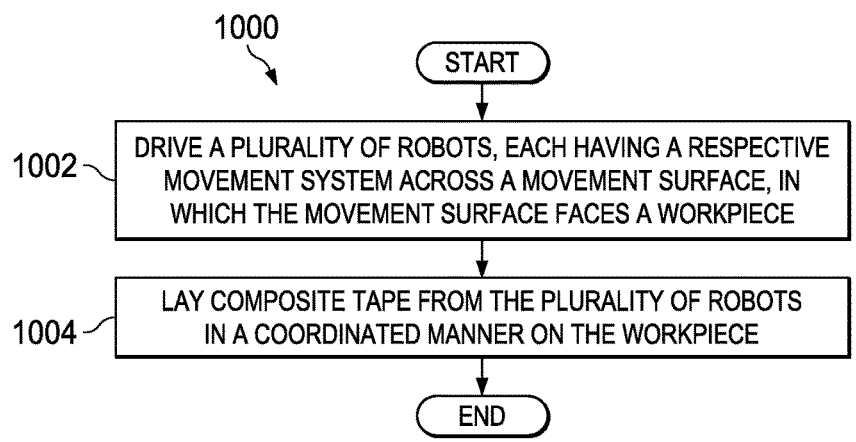
FIG. 10 is an illustration of a flowchart of a process for laying composite tape in accordance with an illustrative embodiment.

Turning now to FIG. 10, an illustration of a flowchart of a process for laying composite tape is depicted in accordance with an illustrative embodiment. Process 1000 may be performed using manufacturing assembly 204 of FIG. 2. Process 1000 may be used to lay composite tape 201 of FIG. 2.

Process 1000 may first drive a plurality of robots, each having a respective movement system across a movement surface, in which the movement surface is in an active position relative to a workpiece (operation 1002). Process 1000 may then lay composite tape from the plurality of robots in a coordinated manner on the workpiece (operation 1004). Afterwards, the process terminates.

In some illustrative examples, laying the composite tape on the workpiece comprises moving a pedestal of a robot of the plurality of robots relative to the movement surface. In some illustrative examples, laying the composite tape on the workpiece comprises moving a tape laying head of a robot of the plurality of robots relative to the workpiece using a positioning system. In some examples, each of the plurality of robots comprises the respective movement system coupled to a pedestal, a positioning system coupled to the pedestal, and a tape laying head connected to the positioning system.

Figure 11:
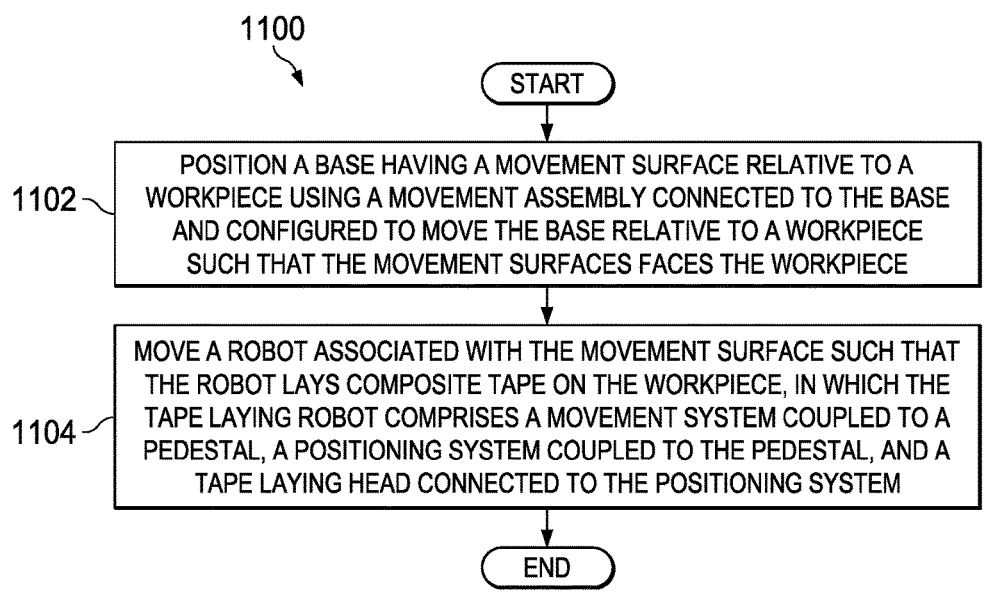
FIG. 11 is an illustration of a flowchart of a process for laying composite tape in accordance with an illustrative embodiment.

Turning now to FIG. 11, an illustration of a flowchart of a process for laying composite tape is depicted in accordance with an illustrative embodiment. Process 1100 may be performed using manufacturing assembly 204 of FIG. 2. Process 1100 may be used to lay composite tape 201 of FIG. 2.

Process 1100 may position a base having a movement surface relative to a workpiece using a movement assembly connected to the base and configured to move the base relative to a workpiece such that the movement surface is in an active position relative to the workpiece (operation 1102). Process 1100 may then move a robot associated with the movement surface such that the robot lays composite tape on the workpiece, in which the tape laying robot comprises a movement system coupled to a pedestal, a positioning system coupled to the pedestal, and a tape laying head connected to the positioning system (operation 1104). Afterwards, the process terminates. In some illustrative examples, moving the robot associated with the movement surface comprises moving the tape laying head relative to the workpiece using at least one of the movement system or the positioning system to lay composite tape on the workpiece.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 1000 may further comprise moving a first robot of the plurality of robots to an opposite side of a second robot of the plurality of robots on the movement surface. As another example, in process 1000, the movement surface may be on a face of a base, wherein a movement assembly configured to move the base relative to the workpiece is connected to the base, and further comprising positioning the base relative to the workpiece which comprises using the movement assembly. As another example, process 1000 may further comprise moving a first robot of the plurality of robots to an edge of the movement surface; and removing the first robot from the movement surface to perform maintenance on the first robot.

As a further example, in process 1100, the robot may be a first robot, and process 1100 may further comprise moving a second robot past the first robot. As yet another example, process 1100 may further comprise moving the robot relative to the workpiece by moving the robot on the movement surface using the movement system.

Figure 12:
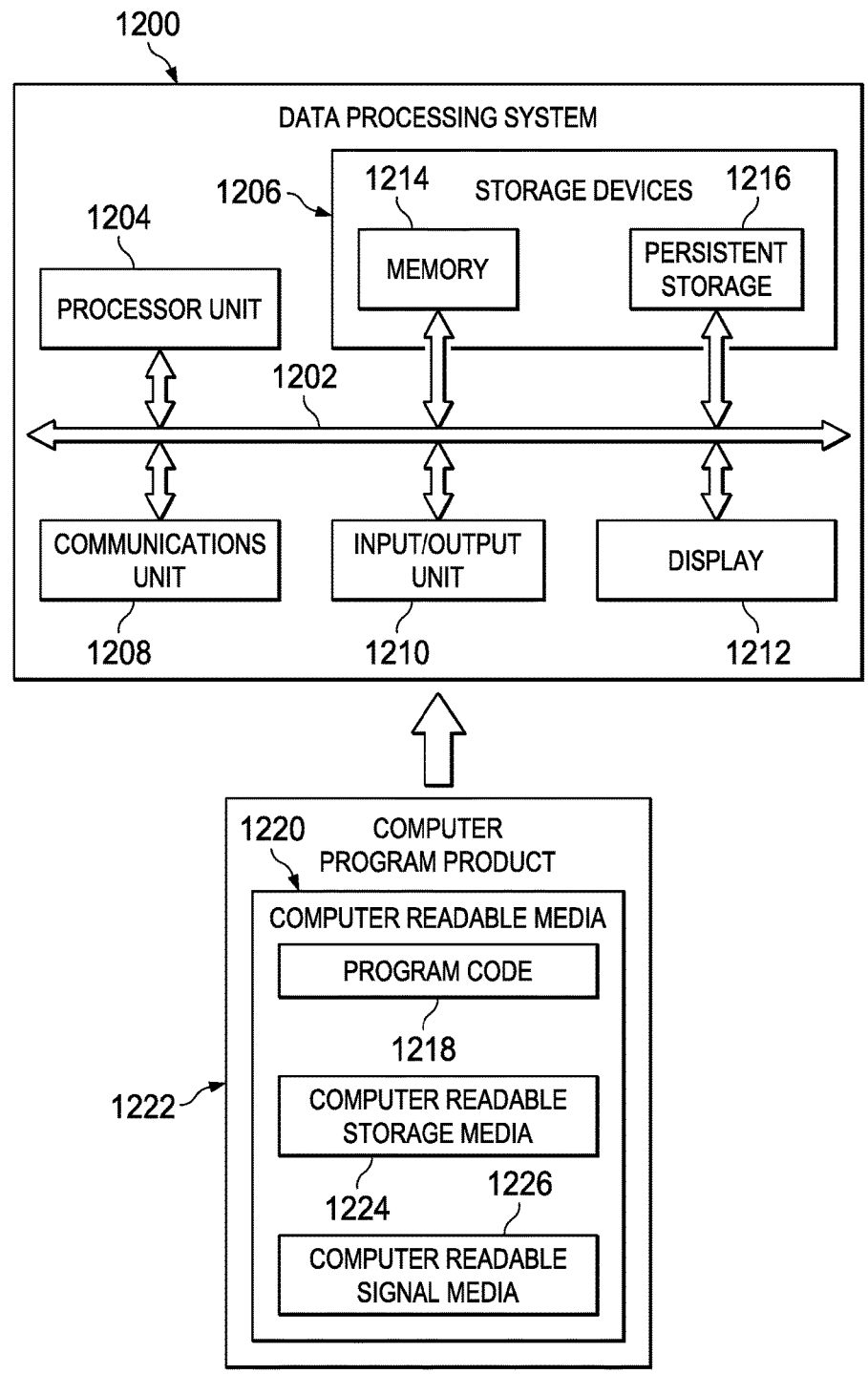
FIG. 12 is an illustration of a data processing system in the form of a block diagram in accordance with an illustrative embodiment.

Turning now to FIG. 12, an illustration of a data processing system is depicted in the form of a block diagram in accordance with an illustrative embodiment. Data processing system 1200 may be used to implement controller 206 in FIG. 2. As depicted, data processing system 1200 includes communications framework 1202, which provides communications between processor unit 1204, storage devices 1206, communications unit 1208, input/output unit 1210, and display 1212. In some cases, communications framework 1202 may be implemented as a bus system.

Processor unit 1204 is configured to execute instructions for software to perform a number of operations. Processor unit 1204 may comprise a number of processors, a multi-processor core, and/or some other type of processor, depending on the implementation. In some cases, processor unit 1204 may take the form of a hardware unit, such as a circuit system, an application specific integrated circuit (ASIC), a programmable logic device, or some other suitable type of hardware unit.

Instructions for the operating system, applications, and/or programs run by processor unit 1204 may be located in storage devices 1206. Storage devices 1206 may be in communication with processor unit 1204 through communications framework 1202. As used herein, a storage device, also referred to as a computer readable storage device, is any piece of hardware capable of storing information on a temporary and/or permanent basis. This information may include, but is not limited to, data, program code, and/or other information.

Memory 1214 and persistent storage 1216 are examples of storage devices 1206. Memory 1214 may take the form of, for example, a random access memory or some type of volatile or non-volatile storage device. Persistent storage 1216 may comprise any number of components or devices. For example, persistent storage 1216 may comprise a hard drive, a flash memory, a rewritable optical disk, a rewritable magnetic tape, or some combination of the above. The media used by persistent storage 1216 may or may not be removable.

Communications unit 1208 allows data processing system 1200 to communicate with other data processing systems and/or devices. Communications unit 1208 may provide communications using physical and/or wireless communications links.

Input/output unit 1210 allows input to be received from and output to be sent to other devices connected to data processing system 1200. For example, input/output unit 1210 may allow user input to be received through a keyboard, a mouse, and/or some other type of input device. As another example, input/output unit 1210 may allow output to be sent to a printer connected to data processing system 1200.

Display 1212 is configured to display information to a user. Display 1212 may comprise, for example, without limitation, a monitor, a touch screen, a laser display, a holographic display, a virtual display device, and/or some other type of display device.

In this illustrative example, the processes of the different illustrative embodiments may be performed by processor unit 1204 using computer-implemented instructions. These instructions may be referred to as program code, computer usable program code, or computer readable program code and may be read and executed by one or more processors in processor unit 1204.

In these examples, program code 1218 is located in a functional form on computer readable media 1220, which is selectively removable, and may be loaded onto or transferred to data processing system 1200 for execution by processor unit 1204. Program code 1218 and computer readable media 1220 together form computer program product 1222. In this illustrative example, computer readable media 1220 may be computer readable storage media 1224 or computer readable signal media 1226.

Computer readable storage media 1224 is a physical or tangible storage device used to store program code 1218, rather than a medium that propagates or transmits program code 1218. Computer readable storage media 1224 may be, for example, without limitation, an optical or magnetic disk or a persistent storage device that is connected to data processing system 1200.

Alternatively, program code 1218 may be transferred to data processing system 1200 using computer readable signal media 1226. Computer readable signal media 1226 may be, for example, a propagated data signal containing program code 1218. This data signal may be an electromagnetic signal, an optical signal, and/or some other type of signal that can be transmitted over physical and/or wireless communications links.

Figure 13:
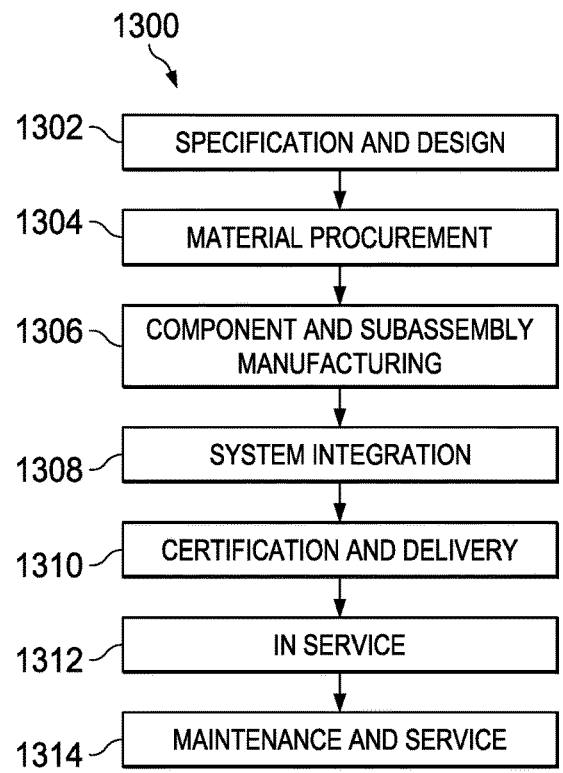
FIG. 13 is an illustration of a block diagram of an aircraft manufacturing and service method in accordance with an illustrative embodiment.

The illustrative embodiments of the disclosure may be described in the context of aircraft manufacturing and service method 1300, as shown in FIG. 13, and aircraft 1400, as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with a plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1300 in FIG. 13. One or more illustrative embodiments may be used during component and subassembly manufacturing 1306. For example, manufacturing assembly 204 may be used to lay down composite tape 201 on workpiece 202 of FIG. 2 during component and subassembly manufacturing 1306. In some illustrative example, workpiece 202 may be at least a portion of airframe 1402. Thus, one or more illustrative embodiments may be used to lay down composite tape to form at least a component of airframe 1402 during component and subassembly manufacturing 1306. Further, manufacturing assembly 204 may also be used to perform maintenance during maintenance and service 1314.

The illustrative embodiments may provide a method and apparatus for laying down composite tape on a workpiece. Manufacturing assembly 204 may include plurality of robots 210 that may move along movement surface 236 to deposit composite tape 201 on workpiece 202. Movement surface 236 may be external to workpiece 202. Plurality of robots 210 may lay down composite tape 201 in a coordinated manner. By using plurality of robots 210 to lay down composite tape 201, manufacturing times for workpiece 202 may be decreased. Further, multiple layers of composite material may be laid down on workpiece 202 simultaneously by plurality of robots 210. By using plurality of robots 210, more tape laying heads may be employed simultaneously than by using conventional robotic arms.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
positioning a movement surface into an active position using a movement assembly configured to move a base relative to a workpiece, wherein the movement surface is a face of a base, and wherein the movement surface forms a substantially offset-surface relative to the workpiece when the movement surface is in the active position;
driving a plurality of robots, each having a respective movement system, across the movement surface and between the movement surface and the workpiece; and
laying composite tape from the plurality of robots in a coordinated manner on the workpiece.

2. The method of claim 1, wherein laying the composite tape on the workpiece comprises moving a pedestal of a robot of the plurality of robots relative to the movement surface.

3. The method of claim 1, wherein laying the composite tape on the workpiece comprises moving a tape laying head of a robot of the plurality of robots relative to the workpiece using a positioning system.

4. The method of claim 1, wherein each of the plurality of robots comprise the respective movement system coupled to a pedestal, a positioning system coupled to the pedestal, and a tape laying head connected to the positioning system.

5. The method of claim 1 further comprising:
moving a first robot of the plurality of robots to an opposite side of a second robot of the plurality of robots on the movement surface using a movement system of the first robot.

6. The method of claim 1 further comprising:
moving a first robot of the plurality of robots to an edge of the movement surface using a movement system of the first robot; and
removing the first robot from the movement surface to perform maintenance on the first robot.

7. The method of claim 1 further comprising:
sensing relative positions of the plurality of robots while driving the plurality of robots across the movement surface to form sensor data; and
controlling movement of the plurality of robots based on the sensor data.

8. A method comprising:
positioning a base having a movement surface relative to a workpiece using a movement assembly connected to the base and configured to move the base relative to the workpiece such that the movement surface is in an active position relative to the workpiece wherein the movement surface forms a substantially offset-surface relative to the workpiece when the movement surface is in the active position;
moving a robot between the movement surface and the workpiece such that the robot lays composite tape on the workpiece, in which the robot comprises a movement system coupled to a pedestal, a positioning system coupled to the pedestal, and a tape laying head connected to the positioning system;

sensing positions of the tape laying head of the robots while moving the robot to form sensor data; and controlling movement of the tape laying head based on the sensor data.

9. The method of claim 8, wherein moving the robot associated with the movement surface comprises moving the tape laying head relative to the workpiece using at least one of the movement system or the positioning system to lay composite tape on the workpiece.

10. The method of claim 8, wherein the robot is a first robot and further comprising:

moving a second robot past the first robot using a movement system of the second robot.

11. The method of claim 8 further comprising:

moving the robot relative to the workpiece by moving the robot on the movement surface using the movement system.

* * * * *